United States Patent
Weatherhead

(10) Patent No.: US 8,832,579 B2
(45) Date of Patent: Sep. 9, 2014

(54) SYSTEM FOR CREATION AND MANAGEMENT OF INDUSTRIAL AUTOMATION AND INFORMATION SOLUTIONS AND SERVICES

(75) Inventor: N. Andrew Weatherhead, Ayr (CA)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 1399 days.

(21) Appl. No.: 12/190,056

(22) Filed: Aug. 12, 2008

(65) Prior Publication Data

US 2010/0042376 A1    Feb. 18, 2010

(51) Int. Cl.
  *G06F 3/048* (2013.01)
  *G06F 3/00* (2006.01)
  *G05B 15/00* (2006.01)
  *G06F 17/50* (2006.01)
  *G06F 9/44* (2006.01)
  *G05B 19/409* (2006.01)

(52) U.S. Cl.
  CPC .... *G05B 19/409* (2013.01); *G05B 2219/32128* (2013.01); *G06F 8/10* (2013.01); *G06F 8/34* (2013.01)
  USPC ............ 715/771; 715/708; 715/712; 700/83; 703/1

(58) Field of Classification Search
  None
  See application file for complete search history.

(56) References Cited

U.S. PATENT DOCUMENTS

| | | | |
|---|---|---|---|
| 4,536,840 A | 8/1985 | Borta | |
| 4,831,580 A | 5/1989 | Yamada | |
| 4,885,694 A * | 12/1989 | Pray et al. | 705/400 |
| 4,901,221 A * | 2/1990 | Kodosky et al. | 715/771 |
| 5,797,015 A | 8/1998 | Daniels et al. | |
| 5,920,718 A | 7/1999 | Uczekaj et al. | |
| 5,966,532 A | 10/1999 | McDonald et al. | |
| 6,053,951 A | 4/2000 | McDonald et al. | |
| 6,117,187 A | 9/2000 | Staelin | |
| 6,163,878 A | 12/2000 | Kohl | |
| 6,170,081 B1 | 1/2001 | Fontana et al. | |
| 6,230,318 B1 | 5/2001 | Halstead et al. | |
| 6,243,857 B1 | 6/2001 | Logan, III et al. | |
| 6,268,853 B1 * | 7/2001 | Hoskins et al. | 700/83 |
| 6,476,828 B1 | 11/2002 | Burkett et al. | |
| 6,530,054 B2 | 3/2003 | Hollander | |
| 6,564,368 B1 | 5/2003 | Beckett et al. | |
| 6,564,375 B1 | 5/2003 | Jiang | |
| 6,574,791 B1 | 6/2003 | Gauthier et al. | |
| 6,615,198 B1 | 9/2003 | Aldrich | |
| 6,871,340 B1 | 3/2005 | Gillis | |
| 6,922,684 B1 | 7/2005 | Aldridge et al. | |
| 6,957,418 B2 | 10/2005 | Batcha et al. | |

(Continued)

OTHER PUBLICATIONS

Office Action dated Aug. 10, 2010 for U.S. Appl. No. 12/196,105, 25 pages.

(Continued)

*Primary Examiner* — Stephen Alvesteffer
(74) *Attorney, Agent, or Firm* — Amin, Turocy & Watson, LLP

(57) ABSTRACT

The innovation relates to a system and/or methodology for the creation and management of industrial automation services and design templates. In addition, it allows for users to view processes, applications, protocols, data types, and so forth as semantically intuitive graphical objects that can be dragged, dropped, and tagged to allow for combining functionalities and/or integrating disparate applications or systems through a services model. Additionally, the innovation provides a library for user management of the services and templates.

39 Claims, 13 Drawing Sheets

(56) References Cited

U.S. PATENT DOCUMENTS

| | | | |
|---|---|---|---|
| 6,959,268 B1* | 10/2005 | Myers, Jr. et al. | 703/6 |
| 7,003,475 B1* | 2/2006 | Friedland et al. | 705/7.13 |
| 7,139,999 B2* | 11/2006 | Bowman-Amuah | 717/101 |
| 7,159,183 B1 | 1/2007 | Kudukoli et al. | |
| 7,210,117 B2* | 4/2007 | Kudukoli et al. | 717/100 |
| 7,243,334 B1 | 7/2007 | Berger et al. | |
| 7,340,684 B2 | 3/2008 | Ramamoorthy et al. | |
| 7,356,773 B1 | 4/2008 | Barraclough | |
| 7,461,040 B1* | 12/2008 | Goldman et al. | 706/45 |
| 7,613,599 B2 | 11/2009 | Bade et al. | |
| 7,729,891 B2 | 6/2010 | Fine et al. | |
| 2002/0004804 A1* | 1/2002 | Muenzel | 707/513 |
| 2002/0054099 A1* | 5/2002 | Schmitt et al. | 345/762 |
| 2003/0001896 A1* | 1/2003 | Johnson et al. | 345/771 |
| 2004/0177002 A1 | 9/2004 | Abelow | |
| 2005/0021599 A1* | 1/2005 | Peters | 709/203 |
| 2005/0273395 A1 | 12/2005 | Andersson et al. | |
| 2005/0278576 A1 | 12/2005 | Hekmatpour | |
| 2006/0058929 A1* | 3/2006 | Fossen et al. | 701/21 |
| 2006/0064211 A1* | 3/2006 | Johansen et al. | 701/21 |
| 2006/0236286 A1 | 10/2006 | Tseng | |
| 2007/0100478 A1* | 5/2007 | Egeland et al. | 700/45 |
| 2008/0148191 A1* | 6/2008 | Weinlander | 715/854 |
| 2008/0168092 A1* | 7/2008 | Boggs et al. | 707/104.1 |
| 2009/0037831 A1* | 2/2009 | Best et al. | 715/764 |
| 2009/0216605 A1* | 8/2009 | Brayton | 705/10 |
| 2009/0327991 A1 | 12/2009 | Weatherhead | |
| 2010/0070345 A1 | 3/2010 | Abelow | |

OTHER PUBLICATIONS

Office Action dated Dec. 7, 2010 for U.S. Appl. No. 12/196,105, 11 pages.

* cited by examiner

ENGINEERING SPECIFICATION

- User Requirements Specification 202
- Functional Specification 204
- Software Design Specification 206
- Hardware Design Specification 208
- Installaion Specification 210
- Test Specifications 212
- Quality / Validation Specifications 214
- Resource Requirements 216

SYSTEM FOR CREATION AND MANAGEMENT OF INDUSTRIAL AUTOMATION AND INFORMATION SOLUTIONS AND SERVICES

TECHNICAL FIELD

The subject innovation relates generally to industrial automation design, and more particularly to the creation and management of industrial automation and information solutions and services.

BACKGROUND

Industrial Automation has revolutionized manufacturing in a rapidly expanding range of applications. As engineers strive to create systems of ever increasing complexity, the development of new and innovative information solutions has become more essential. Increases in computer networking capability, processing power, and storage capacity have made faster, smarter and more reliable automation systems possible. However, the efficiency at which the systems can be designed, programmed, and installed has largely lagged behind the pace at which the automation systems themselves are improving.

Currently, industrial automation designers, programmers, and engineers are often required to reengineer identical or similar components repeatedly for different projects. In addition, frequently a high degree of redundancy exists between the designs of components for unrelated projects. This redundancy can be caused by industry specific, customer specific, and/or application specific requirements.

The continual reinventing and reengineering of identical or similar components is highly inefficient. Moreover, due to the high degree of redundancy the constant rehashing of similar subject matter is wholly unnecessary. Consequently, a substantial need exists for an industrial automation and information solution that reduces the necessity for reengineering and increases efficiency.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The claimed subject matter relates to a system and/or method for creation and management of industrial automation and information solutions and services. In accordance with various aspects of the claimed subject matter, an interface component facilitates user interaction with the system, and allows for users to view processes, applications, protocols, data types, etc. as semantically intuitive graphical objects that can be dragged, dropped, and tagged to allow for combining functionalities and/or integrating disparate applications or systems through a services model.

The design tool can generate industrial automation services and/or design templates based at least in part on the data obtained by the interface component. Generating industrial automation services is accomplished at least in part by de-abstracting and customizing one or more design templates based on the data and/or user input. Additionally, design templates are created via the design tool by abstracting one or more services by removing class specific layers and/or generalizing the services.

The system can be an application programming interface (API) that enables describing services and templates using a common language or platform. The binding component provides for binding underlying languages in their native languages via translation layers or translation bridges between respective applications. The industrial automation services and design templates generated by the design tool can be maintained in a library, wherein the user can manage the library via the interface and design tools.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

BRIEF DESCRIPTION OF THE DRAWINGS

FIG. 2 is an example illustration of an engineering specification shown in accordance with an aspect of the present specification.

DETAILED DESCRIPTION

Figure 1:
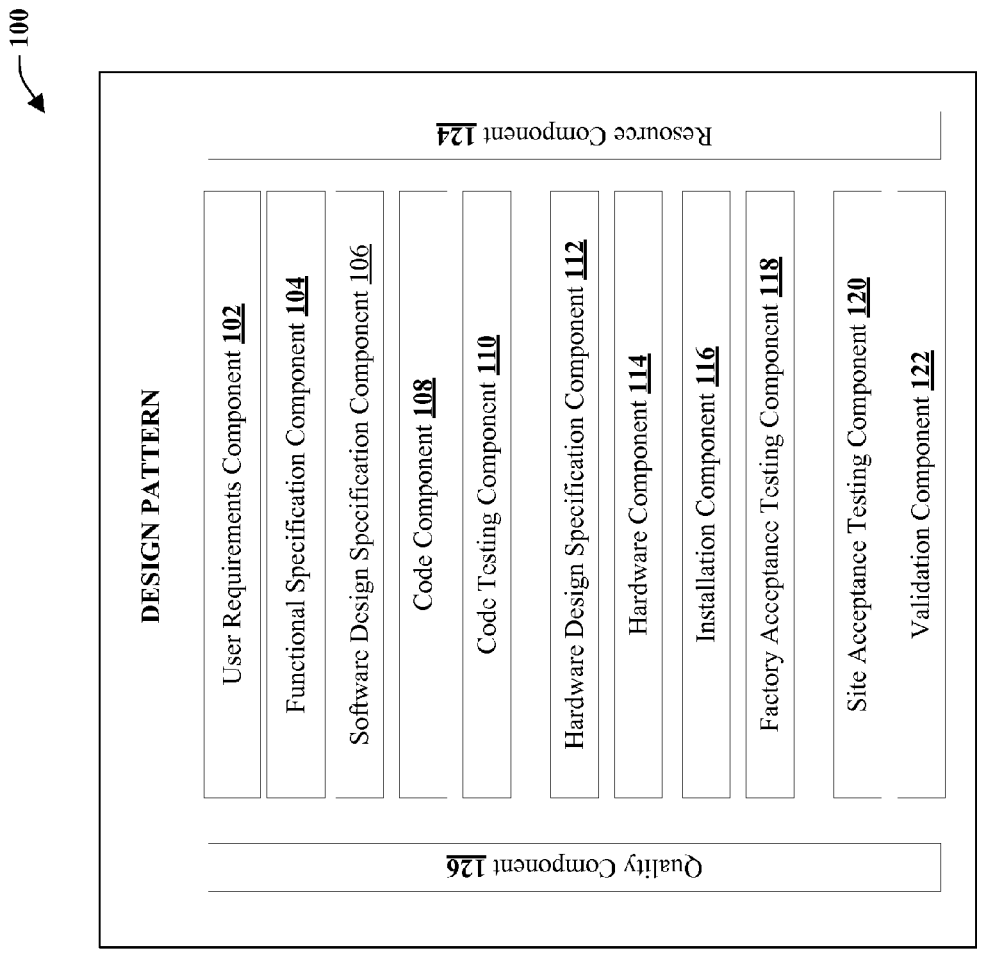
FIG. 1 is an example illustration of a design pattern shown in accordance with an aspect of the present specification.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are illustrated in block diagram form in order to facilitate describing the embodiments.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions therefrom. For instance, by observing that one user interacts with a subset of other users over a network, it may be determined or inferred that this subset of users belongs to a desired social network of interest for the one user as opposed to a plurality of other users who are never or rarely interacted with.

Referring initially to FIG. 1, an example illustration of a design pattern 100 is shown in accordance with an aspect of the present innovation. The design pattern 100 is an abstracted collection of sub-components containing generic design elements. The sub-components can include but are not limited to a user requirements component 102, a functional specification component 104, a software design specification component 106, a code component 108, a code testing component 110, a hardware design specification component 112, a hardware component 114, an installation component 116, a factory acceptance and testing component 118, a site acceptance and testing component 120, and a validation component 122, a resource component 124, and a quality component 126. It is to be appreciated that the terms design pattern and design template are used interchangeably herein.

The user requirements component 102 obtains one or more user requirements. The user requirements can be obtained from a set of inputs, including explicit user inputs (e.g., configuration selections, question/answer) such as from mouse selections, keyboard selections, speech, scanner and so forth. Additionally or alternatively, the user requirements can be obtained via data transfer from a user computer, a third party computer, an associated computer, a data store, etc. Typically, the user requirements include general information regarding the objectives and goals of the user's project or group of projects. For example, the user requirements can state that the goal of a particular project is to manufacture widgets. Additionally, the user requirements can include quality specifications such as the rate at which the widgets need to be manufactured, the size of the widgets, quality tolerances, etc.

The functional specification component 104 generates one or more functional specifications based on the user requirements, wherein a functional specification is a generic list of equipment required to achieve the described functionality. For example, the functional specification component 104 can determine the engineering processes necessary to make the specified number of widgets, at the specified rate, within said quality tolerances. The functional specifications can include the equipment to be used, the sequence of operations, process inputs and outputs, process parameters, process data, operator interaction, and so forth.

The software design specification component 106 generates one or more software design specifications based on the functional specifications, wherein the software design specifications relate the abstract description in the functional specification to concrete instances of modules within the software. The software design specifications are high-level (e.g. generic) representations illustrative of a sequence of events, and handling of exceptions, that can be translated into computer executable commands. The software design specifications can be illustrated via block diagrams, flow charts, drawings (e.g. S88 batch-control-process-requirements).

The code component 108 generates pre-built modules of software designed for the abstract which accept the entity relationship defined by the software design specification component 106. The high-level representations contained in the software design specifications are mapped to functions and/or computer executable commands. For example, the software design specification may require a motor to be run at a speed X. The code component 108 can generate the software code necessary to run the motor at speed X. Additionally or alternatively, the code component 108 can generate the code based at least in part on one or more design patterns. For example, if the functional specification requires a type 1 motor to be run at speed X, then the code component 108 can obtain a template regarding running a type 1 motor, and modify the design pattern to operate the motor at speed X.

The code testing component 110 tests the software code generated by the code component 108. The code testing component 110 can test the code to ensure it provides each function outlined in the functional specification(s). The code testing component may not need to test every instance of code, because a given project may require multiple instances of the same code. For instance, a functional specification may require a series of flow meters to perform an operation. The software design specification component 106 and code component 108 can handle each instance of a flow meter in a similar manner, resulting in multiple instances of similar or identical software code. Consequently, the code testing component 110 may only be required to check a single instance of a flow meter to ensure that all related flow meter codes are functioning correctly. Moreover, the code testing component 110 can produce one or more testing specifications. The testing specifications detail a testing schema, and are based at least in part on the functional specifications, and software design specifications. Additionally, for each test performed the code testing component 110 can subsequently generate one or more testing reports that detail the results of the tests. The testing reports including but not limited to errors, warnings, accuracy, possible solutions, expected results, actual results, etc.

The hardware design specification component 112 generates one or more hardware design specifications based on the functional specifications and/or software design specifications. The hardware design specifications are high-level representations of one or more hardware modules, and configurations of the modules, designed to execute the objectives of the functional specification and/or the software design specifications. For example, if the functional specifications and software design specifications require a flow meter, the hardware design specification component 112 can determine the inputs and outputs (I/O) required for the flow meter, the network(s) that must to be connected to the I/O points, whether a control cabinet is necessary, and so forth. The hardware design specifications can be illustrated as drawings (e.g. electrical drawings, mechanical drawings, etc.), flowcharts, block diagrams, etc.

Additionally, the hardware design specification component 112 can add one or more additional specification requirement layers, including but not limited to customer specific requirements, industry specific requirements, application specific requirements, and/or project specific requirements. For example, if the project is for an industry that requires explosion proof materials, then the design specification component 112 can add a corresponding industry specific requirements layer to the hardware design specifications. Similarly, if a customer has specific requirements, then an appropriate customer requirements layer can be added to the hardware design specification.

The hardware component 114 can generate a comprehensive list of the hardware required for the project based on the hardware design specifications. The list can be a bill of materials (B.O.M.), wherein the B.O.M. can include but is not limited to part names, quantities, part numbers, manufacturers, etc.

The installation component 116 can generate one or more installation specifications based on the hardware design specifications and the B.O.M. The installation specifications detail specifications of materials necessary to install the hardware modules, including but not limited to runs of wire, termination boxes, wiring specifications, conduit specifications, piping, definitions, etc.

The factory acceptance testing component 118 can qualify a design build prior to installation, including any prebuilt software or hardware modules. For example, the factory acceptance testing component 118 can test the I/O, communications, controls, and so forth of prebuilt software modules and control panels. In addition, the site acceptance testing component 120 can test software or hardware modules during or after the installation. For example, the site acceptance testing component 120 can test the I/O, communications, controls, and so forth once installation of the project is complete.

The validation component 122 validates test results from the factory acceptance testing component 118 and site acceptance testing component 120. Additionally, the validation component 122 can ensure that each element of the software design and hardware design specifications operate as intended. For example, the validation component may be particularly useful for life sciences based projects, where simply testing the design is insufficient, and validation of the test results is required.

The resource component 124 determines a cost amount (e.g. money, time, etc.) for a given project or set of projects. The resource component 124 can represent the cost amount as a maximum value, a minimum value, a target value (e.g. set point), a percentage value, a distribution, a state value (e.g. low, medium, or high), etc. The resource component 124 can determine the cost amount based on the user requirements and/or functional specification. Additionally or alternatively, the resource component 124 can infer the cost amount. The cost amount can be used by both the one or more other components in order to generate the engineering specifications. For example, the resource component 124 can determine that the maximum amount for a project is $10,000. The software design specification component 106, the hardware design specification component 112, and the hardware component 114 will maintain an aggregate cost of less than or equal to the maximum amount of $10,000.

The quality component 126 determines a quality metric based at least in part on the user requirements. The quality metric can be a real number, a target, a percentage, a distribution, a state (e.g. low, medium, or high), etc. The quality metric can be determined based on the user requirements and/or functional specifications, and can be one or more additional sub-components. For example, the quality component 126 can determine that the quality metric should be "high." Subsequently, the other sub-components will adapt their designs to accommodate the quality metric by using only modules, parts, etc. designated as "high" quality. It is appreciated that the quality component 126 and resource component 124 can be related, because typically there is a correlation between resources and quality. For example, as the cost of the modules increases presumably the quality does as well, and vice versa. Therefore, it may be desirable to integrate the resource component 124 and quality component 126.

FIG. 2 is an example illustration of an engineering specification 200 in accordance with an aspect of the present innovation. The engineering specification 200 is a collection of sub-specifications containing industry, project, customer, and/or application specific design elements. The sub-specifications 200 can include but are not limited to a user requirements specification 202, a functional specification 204, a software design specification 206, a hardware design specification 208, an installation specification 210, a test specification 212, a quality/validation specification, and a resource requirements 216.

The user requirements specification 202 includes general information regarding the objectives and goals of the user's project or group of projects. For example, the user requirements specifications 202 can state that the goal of a particular project is to manufacture widgets. Additionally, the user requirements specifications 202 can include quality specifications such as the rate at which the widgets need to be manufactured, the size of the widgets, quality tolerances, etc.

The functional specifications 204 include the engineering processes necessary to make the specified number of widgets, at the specified rate, within said quality tolerances. The functional specifications 204 can include the equipment to be used, the sequence of operations, process inputs and outputs, process parameters, process data, operator interaction, and so forth.

The software design specifications 206 relate the abstract description in the functional specification to concrete instances of modules within the software. The software design specifications are high-level (e.g. generic) representations illustrative of a sequence of events, and handling of exceptions, that can be translated into computer executable commands. The software design specifications can be illustrated via block diagrams, flow charts, drawings (e.g. S88 batch-control-process-requirements).

The hardware design specifications 208 are high-level representations of one or more hardware modules, and configurations of the modules, designed to execute the objectives of the functional specifications 204 and/or the software design specifications 206. For example, if the functional specifications 204 and software design specifications 206 require a flow meter, the hardware design specifications 208 can include the inputs and outputs (I/O) required for the flow meter, the network(s) that must to be connected to the I/O points, whether a control cabinet is necessary, and so forth. The hardware design specifications 208 can be illustrated as drawings (e.g. electrical drawings, mechanical drawings, etc.), flowcharts, block diagrams, etc.

Additionally, the hardware design specifications 208 can be used to generate a comprehensive list of the hardware required for the project based on the hardware design specifications. The list can be a bill of materials (B.O.M.), wherein the B.O.M. can include but is not limited to part names, quantities, part numbers, manufacturers, etc. The installation specifications 210 detail specifications of materials necessary to install the hardware modules, including but not limited to runs of wire, termination boxes, wiring specifications, conduit specifications, piping, definitions, etc.

The testing specifications 212 can be used to qualify a design build prior to installation, including any prebuilt software or hardware modules. In addition, the testing specifications 212 can detail software or hardware modules tests to be executed during or after the installation. For example, site acceptance testing can detail test for the I/O, communications, controls, and so forth once installation of the project is complete.

Additionally, the testing specifications can include code tests for generated software code. Code testing can test the code to ensure it provides each function outlined in the functional specification(s) 204. Code testing may not need to test every instance of code, because a given project may require multiple instances of the same code. For instance, a functional specification may require a series of flow meters to perform an operation. Each instance of a flow meter may be designed in a similar manner, resulting in multiple instances of similar or identical software code. Consequently, code testing may only be required to check a single instance of a flow meter to ensure that all related flow meter codes are functioning correctly. Moreover, the testing specifications 212 can detail a testing schema, and are based at least in part on the functional specifications 204, and software design specifications 206. Additionally, for each test performed one or more testing reports that detail the results of the tests can be generated. The testing reports include but are not limited to errors, warnings, accuracy, possible solutions, expected results, actual results, etc.

The Quality/Validation specifications 214 validate test results from the factory acceptance testing and site acceptance testing. In addition, the validation specifications can be used to ensure that each element of the software design and hardware design specifications operate as intended. For example, the validation specifications may be particularly useful for life sciences based projects, where simply testing the design is insufficient, and validation of the test results is required.

The resource requirements 216 represent the cost amount of the project as a maximum value, a minimum value, a target value (e.g. set point), a percentage value, a distribution, a state value (e.g. low, medium, or high), etc. The resource requirements can be based on the user requirements 202 and/or functional specification 204. Additionally, the resources requirements can include a quality metric based at least in part on the user requirements 202. The quality metric can be a real number, a target, a percentage, a distribution, a state (e.g. low, medium, or high), etc. The quality metric can be determined based on the user requirements 202 and/or functional specifications 204. For example, the quality metric for a given project can be set as "high." Subsequently, the other sub-specifications can be adapted to accommodate the quality metric by using only modules, parts, etc. designated as "high" quality.

Figure 3:
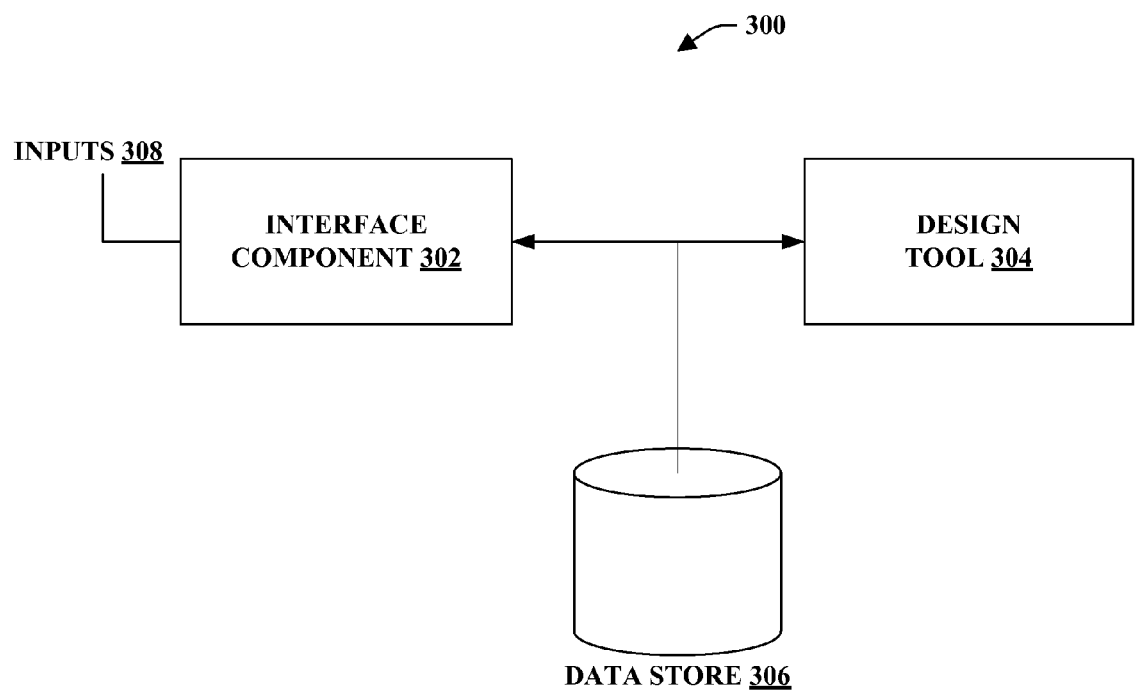
FIG. 3 is a general component block diagram illustrating a system for creation and management of industrial automation services in accordance with an aspect of the present specification.

Referring initially to FIG. 3, an industrial information services creation and management system 300 is illustrated in accordance with an aspect of the subject innovation. The system 300 allows for describing, creating, and modifying industrial automation services (discussed infra) using a common language or platform, and includes an interface component 302, a design tool 304, a data store 306, and a set of inputs 308. The interface component 302 facilitates user interaction with the system 300, and allows for users to view processes, applications, protocols, data types, etc. as semantically intuitive graphical objects that can be dragged, dropped, and tagged to allow for combining functionalities and/or integrating disparate applications or systems through a services model. The interface component 302 may be a form on a web site wherein users access the form via a web browser on a personal computer, mobile device, and so forth. It is also to be appreciated that the interface component 302 may be a standalone application, applet or widget executing on a personal computer or mobile device. For example, user interaction can be accomplished through a sequence of graphical user interfaces (GUI) presented on a user terminal or computer.

The interface component 302 can receive data via the inputs 308. The inputs 308 can include explicit user inputs (e.g., configuration selections, question/answer) such as from mouse selections, keyboard selections, speech, and so forth. The inputs 308 can also include data uploads, wherein a data upload is the transfer of data from the user or a third party source (e.g. computer or a computer readable medium), to the system 300. Additionally or alternatively, the data can be collected from the data store 306. Furthermore, the interface component 302 includes any suitable and/or necessary adapters, connectors, channels, communication paths, etc. to integrate the system 300 into virtually any operating and/or database system(s). Moreover, the interface component 302 can provide various adapters, connectors, channels, communication paths, etc., that provide for interaction with the system 300.

The data can relate to a set of user requirements, a functional specification, a Piping and Instrumentation drawing (P&ID drawing), an electrical drawing, a design template, an operation, a manufacturing execution systems (MES), etc. The user requirements can include but are not limited to general information regarding the objectives of an individual project or group of projects. For example, the set of user requirements can state that the goal of a particular project is to manufacture widgets. Additionally, the user requirements can include quality specifications, such as the rate at which the widgets need to be manufactured, the size of the widgets, quality tolerances, etc. The functional specifications can include the equipment to be used, the sequence of operations, process inputs and outputs, process parameters, process data, operator interaction, and so forth.

The interface component 302 communicates the data to the design tool 304. The design tool 304 facilitates generation of at least one industrial automation service (discussed infra) based at least in part on the data obtained by the interface component 302. Generating industrial automation services ('services') is accomplished at least in part by de-abstracting one or more design templates based on the data and/or user input. The design templates can be obtained from the user or the data store 306 (as previously discussed). Additionally or alternatively, the services can be dynamically created using the design tool 304, wherein the interface component 302 graphically represents industrial automation services and design elements, and the design tool 304 provides for users to develop new services by associating graphically presented services and/or design elements with the services. Moreover, the design tool 304 can provide for users to easily expose functionalities of underlying chunks of code, and combine or execute such code in the form of services. A new service can also be created by clustering a set of other services together (serially, in parallel, or combination thereof).

As noted supra, the user can modify or customize the data, services, and/or design process via the interface component 302. The design tool 304 can track user modifications and translate said modifications to other services components. For example, if the user modifies an element of a software design, the associated elements and functions can be modified in the related designs, such as a hardware design. Additionally, at any point the user can save customizations to the services.

The industrial automation services ('services') can relate to one or more design specifications, drawings, software code, testing schemas, bills of materials (B.O.M), installation specifications, manufacturing execution systems (MES), enterprise resource planning (ERP), etc. The design specifications can include but are not limited to a software design specification, or a hardware design specification. The software design specifications can be embodied via high-level representations illustrative of a sequence of events and handling of exceptions that can be translated into computer executable commands. The software design specifications can be illustrated via block diagrams, flow charts, drawings (e.g. S88 batch-control-process-requirements). The hardware design specifications can be embodied via high-level representations illustrative of one or more hardware modules, and configurations of the modules, including wiring, communications, etc. For example, if the functional specifications and software design specifications require a flow meter, the hardware design specification component can determine the inputs and outputs (I/O) required for the flow meter, the network(s) that must to be connected to the I/O points, whether a control cabinet is necessary, and so forth. The hardware design specifications can be illustrated as drawings (e.g. electrical drawings, mechanical drawings, etc.), flowcharts, block diagrams, etc.

Additionally, as part of the design process the design tool 304 provides for translation of services from a first form to any other available form. For example, if a design specification is obtained by the system for a project, either from the user or generated via the design tool, the interface component 302 can expose at least one interface that facilitates translation of the design specification to any of the other services, such as software code, via the design tool 304.

Figure 4:
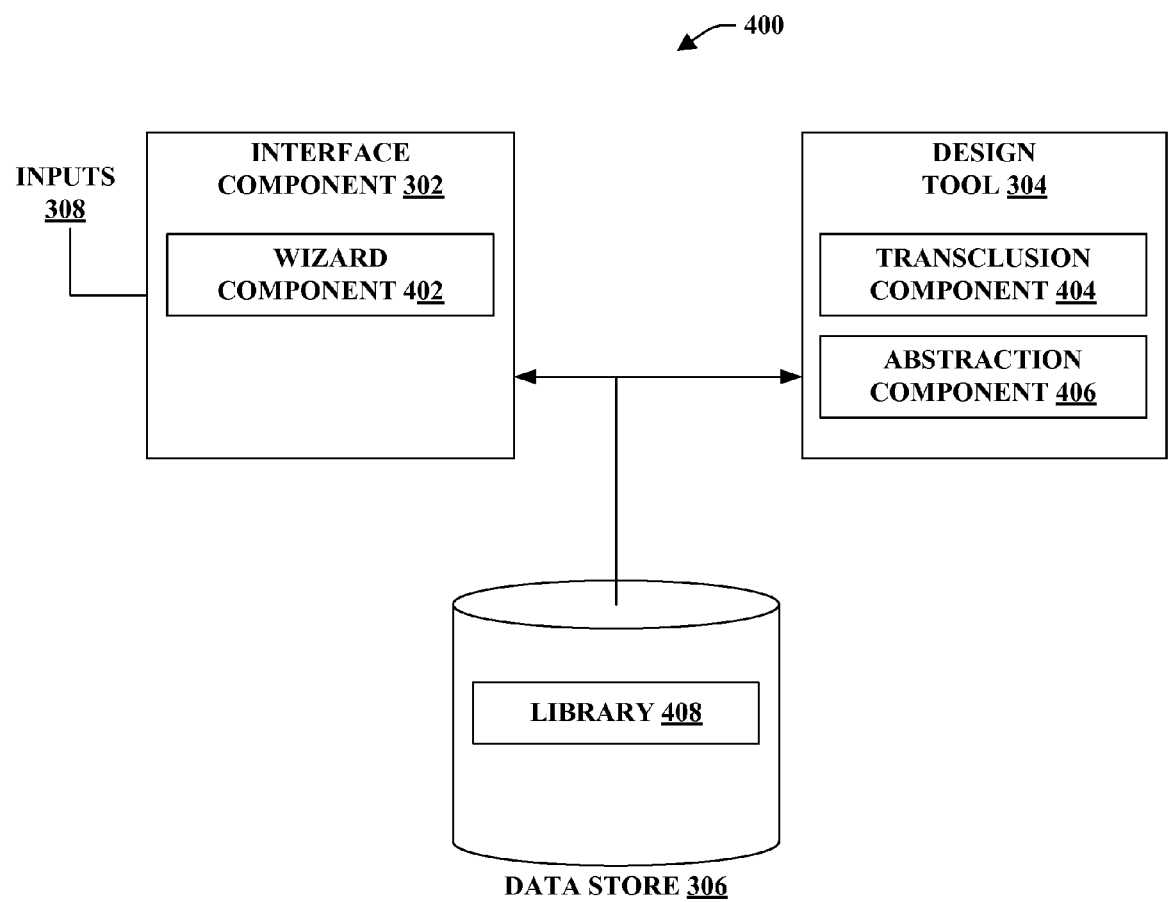
FIG. 4 is a general component block diagram illustrating a system for creation and management of industrial automation services in accordance with an aspect of the present specification.

Referring to FIG. 4, an industrial automation and information services creation and management system 400 is illustrated in accordance with an aspect of the subject innovation. The system 400 allows for describing, creating, and modifying industrial automation services using a common language or platform, and includes an interface component 302, a design tool 304, a data store 306, and a set of inputs 308. As noted supra, the interface component 302 facilitates user interaction with the system 400, and allows for users to view processes, applications, protocols, data types, etc. as semantically intuitive graphical objects that can be dragged, dropped, and tagged to allow for combining functionalities and/or integrating disparate applications or systems through a services model. In addition, the interface component 302 can receive data via the inputs 308. The inputs 308 can include explicit user inputs (e.g., configuration selections, question/answer) such as from mouse selections, keyboard selections, speech, and so forth. The inputs 308 can also include data uploads, wherein the data upload is the transfer of data from the user or a third party source (e.g. computer or a computer readable medium) to the system 400. Additionally or alternatively, the data can be collected from the data store 306.

The interface component 302 includes a wizard component 402 that assists users in describing, creating, and modifying industrial automation services. The wizard component 402 can guide users through starting a new project or modifying an existing project, including uploading or creating data. For example, the wizard component 402 can acquire data by navigating users through a series of questions, wherein the aggregate of the answers to said questions can be used to generate the data. Additionally or alternatively, the wizard component 402 can acquire data by exposing an interface that enables users to upload data to the system 400.

As discussed previously, the data can relate to a user requirement, a functional specification, a Piping and Instrumentation drawing (P&ID drawing), an electrical drawing, a design template, an operation, a manufacturing execution systems (MES), etc. The user requirements can include but are not limited to general information regarding the objectives of an individual project or group of projects.

The interface component 302 communicates the data to the design tool 304. The design tool 304 facilitates generation of at least one industrial automation service (discussed infra) based at least in part on the data obtained by the interface component 302. Furthermore, the design tool 304 includes a transclusion component 404, and an abstraction component 406. The transclusion component 404 de-abstracts the design templates by attaching one or more class specific layers. The design templates (e.g. design patterns) are in essence abstracted design specifications, containing only generic design elements. The design templates can include but are not limited to hardware and software design templates. Hardware design templates are representative of generic configurations of one or more hardware modules. For example, if the project requires operation of a flow meter, the hardware design template can include the inputs and outputs (I/O) required for the flow meter, required network connectivity for the I/O points, a determination of whether a control cabinet is necessary, and any additional generic design elements necessary for the operation of the flow meter. Similarly, software design templates are illustrative of generic sequences of events, and handling of exceptions, that can be translated into computer executable commands. The software design specifications can be graphically represented via block diagrams, flow charts, drawings (e.g. S88 batch-control-process-requirements), and so forth.

The class specific layers can include but are not limited to an industry specific layer, a customer specific layer, an application specific layer, and a project specific layer. The class specific layers contain class specific definitions, which define one or more class specific requirements. Consequently, appending one or more class specific layers to the design templates adds specific requirements to the generic design elements, thus de-abstracting the design templates. For example, a project may require a particular set of process data for the operation of a set of flow meters, and said process data can be defined in the project specific layer. The transclusion component 404 can append the project specific layer to the flow meter design template.

As noted supra, the user can modify or customize the data, services, and/or design process via the interface component 302. The design tool 304 can track user modifications and translate said modifications to other services components. For example, if the user modifies an element of a software design, the associated elements and functions can be modified in the related designs, such as a hardware design. Additionally, at any point the user can save customizations to the services.

As part of the design process the design tool 304 provides for translation of services from a first form to any other available form. For example, if a design specification is obtained by the system for a project, either from the user or generated via the design tool, the interface component 302 can expose at least one interface that facilitates translation of the design specification to any of the other services, such as software code, via the design tool 304.

The abstraction component 406 obtains at least one service, and abstracts the services by removing one or more class specific layers. Removing the class specific layers abstracts a service by extracting the associated class specific content, wherein the remainder is generic design elements of the services. For example, Company Z manufactures widgets. The manufacturing of widgets requires the operation of a conveyor belt. The design specification for the operation of the conveyor belt includes an industry specific layer, and a customer specific layer. Industry regulations require the use of explosion resistant equipment during the manufacturing of widgets, and Company Z requires that only Allen Bradley parts are used on their lines. Therefore, the conveyor belt design specification calls for explosion resistant and Allen Bradley parts, where applicable. It may be desirable to use the conveyor belt design specification for other projects requiring a similar operation. The abstraction component 406 can remove the industry specific and customer specific layers, thereby abstracting the design specification. The remainder is an abstracted design specification for operating a conveyor belt.

The abstraction component 406 enables the creation of new and/or custom design templates. The interface component 302 can expose one or more interfaces that provide users the ability to create, modify, and maintain design templates via the abstraction component 406. For example, users can collect a service from the data store 306, or the interface component 302 can reveal an interface prompting users to upload an existing service. After obtaining the service, users can associate and/or disassociate graphically presented services and design elements to modify the abstraction of the services and create a custom design template.

One or more libraries 408 can be maintained in the data store 306. The libraries 408 can contain but are not limited to the class specific layers, the data, the design templates, and the industrial automation services. The libraries 408 and their contents can be user specific. Additionally, the interface component 302 can expose one or more interfaces that enable users to update, modify, and maintain their specific libraries 408. For example, customer Z may require the use of only Allen Bradley Programmable Logic Controllers (PLCs), and this requirement can be defined in a Customer Z customer specific layer. The customer specific layer can be maintained in a Customer Z specific library 408 in the data store 306, wherein the layer can be retrieved for any Customer Z project. Additionally, Customer Z can modify the customer specific layer, or store additional class specific layers in the library 408.

Figure 5:
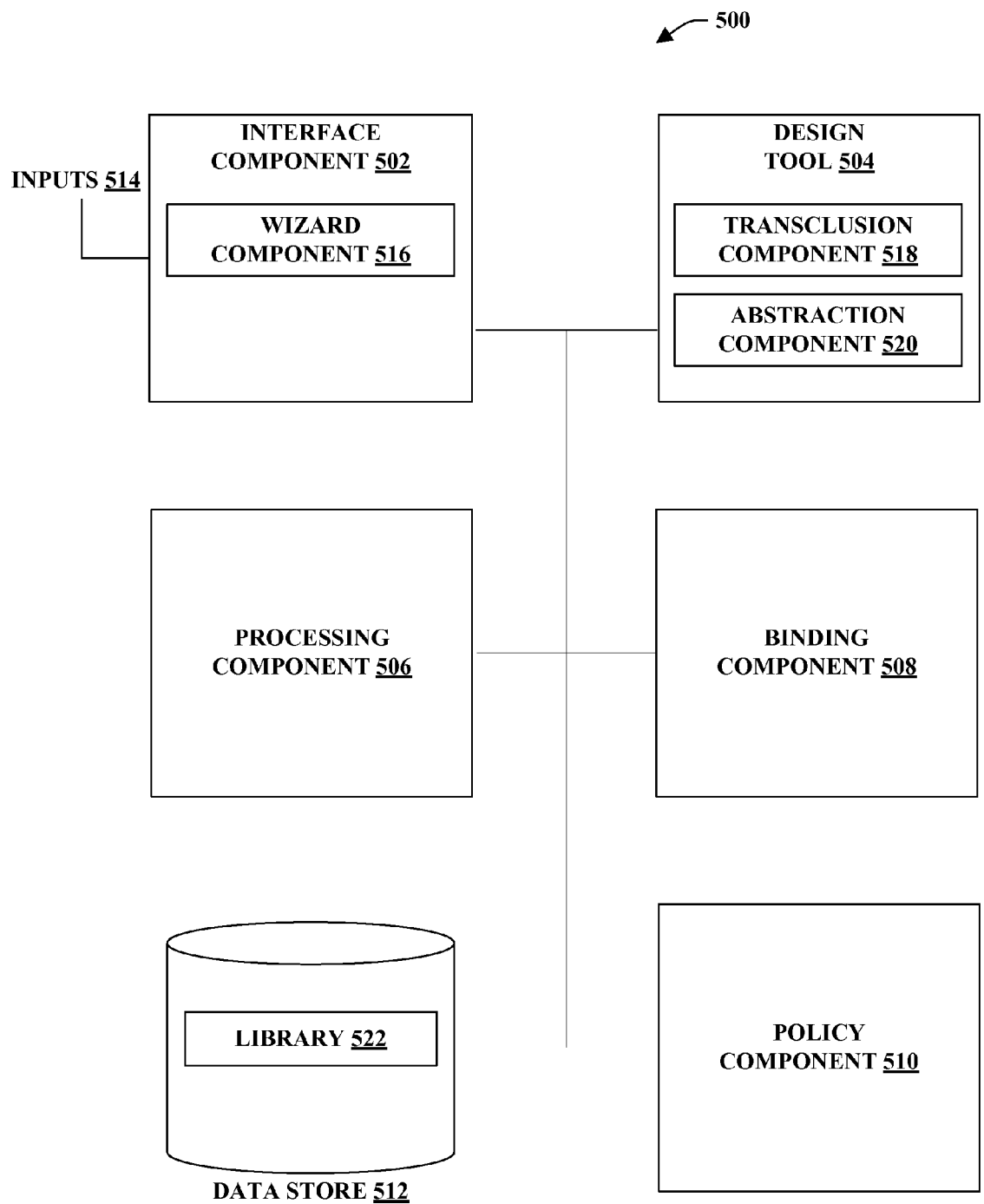
FIG. 5 is a general component block diagram illustrating a system for creation and management of industrial automation services in accordance with an aspect of the present specification.

Referring to FIG. 5, an industrial information services creation and management system 500 is illustrated in accordance with an aspect of the subject innovation. The system 500 can be an application programming interface (API) that facilitates management and creation of industrial automation services ('services') by providing a common language or platform for describing the services. The system 500 includes an interface component 502, a design tool 504, a processing component 506, a binding component 508, a policy component 510, and a data store 512.

The interface component 502 can receive data via one or more inputs 514. The inputs 514 can include explicit user inputs (e.g., configuration selections, question/answer) such as from mouse selections, keyboard selections, speech, and so forth. The inputs 514 can also include data uploads, wherein the data upload is the transfer of data from the user or a third party source (e.g. computer or a computer readable medium) to the system 500. Additionally or alternatively, the data can be collected from the data store 512. The interface component 502 may be a form on a web site wherein users access the form via a web browser on a personal computer, mobile device, and so forth. It is also to be appreciated that the interface component 502 may be a standalone application, applet or widget executing on a personal computer or mobile device. Furthermore, the interface component 502 includes any suitable and/or necessary adapters, connectors, channels, communication paths, etc. to integrate the system 500 into virtually any operating and/or database system(s). Moreover, the interface component 502 can provide various adapters, connectors, channels, communication paths, etc., that provide for interaction with the system 500.

The interface component 502 includes a wizard component 516 that assists users in describing, creating, and modifying industrial automation services. The wizard component 516 can guide users through starting a new project or modifying an existing project, including uploading or creating data. For example, the wizard component 516 can acquire data by directing users through a series of questions, wherein the aggregate of the answers to said questions can be used to generate the data. Additionally or alternatively, the wizard component 516 can acquire data by exposing an interface that enables users to upload data to the system 500.

The data can relate to a user requirement, a functional specification, a Piping and Instrumentation drawing (P&ID drawing), an electrical drawing, a design template, an operation, a manufacturing execution systems (MES), etc. The user requirements can include but are not limited to general information regarding the objectives of an individual project or group of projects. For example, the set of user requirements can state that the goal of a particular project is to manufacture widgets. Additionally, the user requirements can include quality specifications, such as the rate at which the widgets need to be manufactured, the size of the widgets, quality tolerances, etc. The functional specifications can include the equipment to be used, the sequence of operations, process inputs and outputs, process parameters, process data, operator interaction, and so forth.

The interface component 502 communicates the data to the design tool 504. The design tool 504 facilitates generation of at least one industrial automation service (discussed infra) based at least in part on the data obtained by the interface component 502. Industrial automation services ('services') can be generated at least in part by de-abstracting one or more design templates based on the data and/or user input. The design templates can be obtained from the user or the data store 512 (as previously discussed). Additionally or alternatively, the services can be dynamically created using the design tool 504, wherein the interface component 502 graphically represents industrial automation services and design elements, and the design tool 504 provides for users to develop new services by associating graphically presented services and/or design elements with the services. Moreover, the design tool 504 can provide for users to easily expose functionalities of underlying chunks of code, and combine or execute such code in the form of services. A new service can also be created by clustering a set of other services together (serially, in parallel, or combination thereof).

The design tool 504 includes a transclusion component 518, and an abstraction component 520. The transclusion component 518 de-abstracts the design templates by attaching one or more class specific layers. The design templates (e.g. design patterns) are in essence abstracted design specifications, containing only generic design elements. The design templates can be hardware or software design templates. Hardware design templates are representative of generic configurations of one or more hardware modules. For example, if the project requires operation of a flow meter, the hardware design template can include the inputs and outputs (I/O) required for the flow meter, required network connectivity for the I/O points, a determination of whether a control cabinet is necessary, and any additional generic design elements necessary for the operation of the flow meter. Similarly, software design templates are illustrative of generic sequences of events, and handling of exceptions, that can be translated into computer executable commands. The software design specifications can be graphically represented via block diagrams, flow charts, drawings (e.g. S88 batch-control-process-requirements), and so forth.

The class specific layers can include but are not limited to an industry specific layer, a customer specific layer, an application specific layer, and a project specific layer. The class specific layers contain class specific definitions, which define one or more class specific requirements. Consequently, appending one or more class specific layers to the design templates adds specific requirements to its generic design elements, thus de-abstracting the design templates. For example, a project may require a particular set of process data for the operation of a set of flow meters, and said process data can be defined in the project specific layer. The transclusion component 518 can append the project specific layer to the flow meter design template.

Additionally, as part of the design process the design tool 504 provides for translation of services from a first form to any other available form. For example, if a design specification is obtained by the system, either from the user or generated via the design tool 504, the interface component 502 can expose at least one interface that facilitates translation of the design specification to any of the other services, such as software code, via the design tool 504.

As noted supra, the user can modify or customize the data, services, and/or design process via the interface component 502. The design tool 504 can track user modifications and translate said modifications to other services components. For example, if the user modifies an element of a software design, the associated elements and functions can be modified in the related designs, such as a hardware design. Additionally, at any point the user can save customizations to the services.

The abstraction component 520 obtains at least one service, and abstracts the services by removing one or more class specific layers. Removing the class specific layers abstracts a service by extracting the associated class specific content, wherein the remainder is generic design elements of the services. For example, Company Z manufactures widgets. The manufacturing of widgets requires the operation of a conveyor belt. The design specification for the operation of the conveyor belt includes an industry specific layer, and a customer specific layer. Industry regulations require the use of explosion resistant equipment during the manufacturing of widgets, and Company Z requires that only Allen Bradley parts are used on their lines. Therefore, the conveyor belt design specification calls for explosion resistant and Allen Bradley parts, where applicable. It may be desirable to use the conveyor belt design specification for other projects requiring a similar operation. The abstraction component 520 can remove the industry specific and customer specific layers, thereby abstracting the design specification. The remainder is an abstracted design specification for operating a conveyor belt.

The abstraction component 520 enables the creation of new and/or custom design templates. The interface component 502 can reveal one or more interfaces that allow users to create, modify, and maintain design templates via the abstraction component 520 using the interface component 502. For example, users can collect a service from the data store 512, or the interface component 502 can reveal an interface prompting users to upload an existing service. After obtaining the service, the interface component 502 can expose one or more user interfaces that enable users to abstract the service and create a custom design template.

The processing component 506 facilitates the creation and management of services having computer executable commands (e.g. code). The processing component 506 can emulate processors found in industrial controllers to simulate execution of the code and ensure proper operation. For instance, as previously noted, the system 500 can generate services in the form of software code based on data obtained from users or the data store 512. The design tool 504 can evaluate the software code using the processor component 506, wherein evaluation includes testing and verification. Additionally, the processor component 506 can evaluate code for design template abstraction via the abstraction component 520. For instance, the processor component 506 can evaluate code contained in a service for the abstraction component 520, wherein the evaluation can include identifying class specific layers, generic design elements, etc., and the abstraction component 520 can create a design template based at least in part on the chunk of software code.

As noted supra, the system 500 can be an API that provides a common language or platform for describing, creating, and modifying services. The binding component 508 provides for binding underlying languages in their native languages via translation layers or translation bridges between the respective applications. For example, the data obtained to generate one or more services can utilize various native languages, which may be distinct from the languages used by the system 500 to create and/or store the design templates and/or services. Users may require for the final product to be produced in a particular language, and the binding component 508 provides for binding underlying languages between the respective applications.

The policy component 510 provides for determination of system 500 policies. Users can define policies regarding the creation and management of services, such as default management settings and desired creation preferences. Also, the policy component 510 provides for users to define policies regarding design template abstraction, such as level of abstraction. Additionally or alternatively, the policy component 510 can infer policies based on user interaction with the system 500. For example, the policy component can infer a policy for naming services and preferences regarding management of the services based on users prior naming and management of services. The policies can be communicated to and used by the interface component 502, the design tool 504, the processing component 506, the binding component 508, and the data store 512.

One or more libraries 522 can be maintained in the data store 512. The libraries 522 can contain but are not limited to the class specific layers, the data, the design templates, and the industrial automation services. The libraries 522 and their contents can be user specific. Additionally, the interface component 502 can expose one or more interfaces that allow users to update, modify, and maintain their libraries 522. For example, a customer may require the use of only Allen Bradley Programmable Logic Controllers (PLCs), and this requirement can be defined in the customer specific layer. The customer specific layer can be maintained in library 522 in the data store 512 that is specific to the customer, wherein the layer can be retrieved for any project for the customer. Additionally, the customer can modify the customer specific layer, or store additional class specific layers in the library 522.

Figure 6:
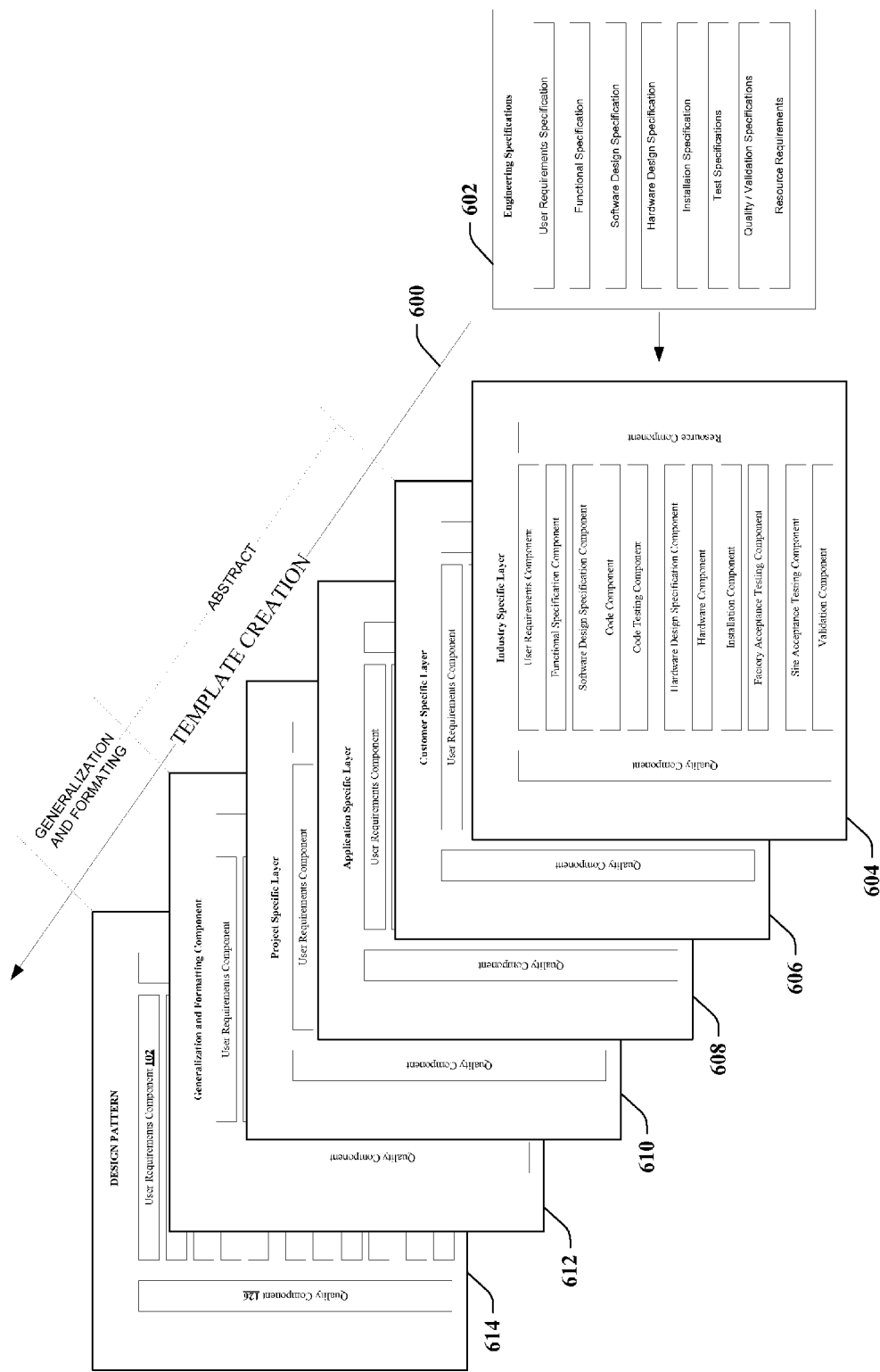
FIG. 6 illustrates an example application of a design pattern abstraction and creation system in accordance with an aspect of the present specification.

Referring to FIG. 6, an example process 600 for design pattern abstraction and creation is shown in accordance with an aspect of the present innovation. The process 600 is illustrated as proceeding along a template creation line from the most specialized application (e.g. engineering specification) to the most generic application (e.g. design pattern). The process 600 commences with an engineering specification 602. The engineering specification 602 can be abstracted by removing one or more class specific layers thereto. As previously discussed, removing one or more class specific layers abstracts the engineering specification 602 by removing class specific definitions from the generic design elements. The class specific layers can include but are not limited to an industry specific layer 604, a customer specific layer 606, an application specific layer 608, and a project specific layer 610. Additionally, the class specific layers can include one or more sub-components. For instance, the class specific layers can include sub-components associated with the sub-components contained in the design pattern 614 (discussed supra).

The abstracted engineering specifications 602 can be generalized and formatted via a generalization and formatting component 612. The generalization and formatting component 612 generalizes designations and identifiers contained in the engineering specifications 602, and/or any of the sub-components contained in the abstracted engineering specifications 602. In addition, the generalization and formatting component 612 formats the abstracted engineering specifications 602 for use as design patterns 614. The design patterns 614 include the results of the abstracted, generalized, and/or formatted engineering specifications 602. For instance, the initial engineering specification 602 can include a functional specification (discussed supra), and the abstracted, generalized, and/or formatted functional specification generates a functional specification component (discussed supra) that is included in the design pattern 614.

Figure 7:
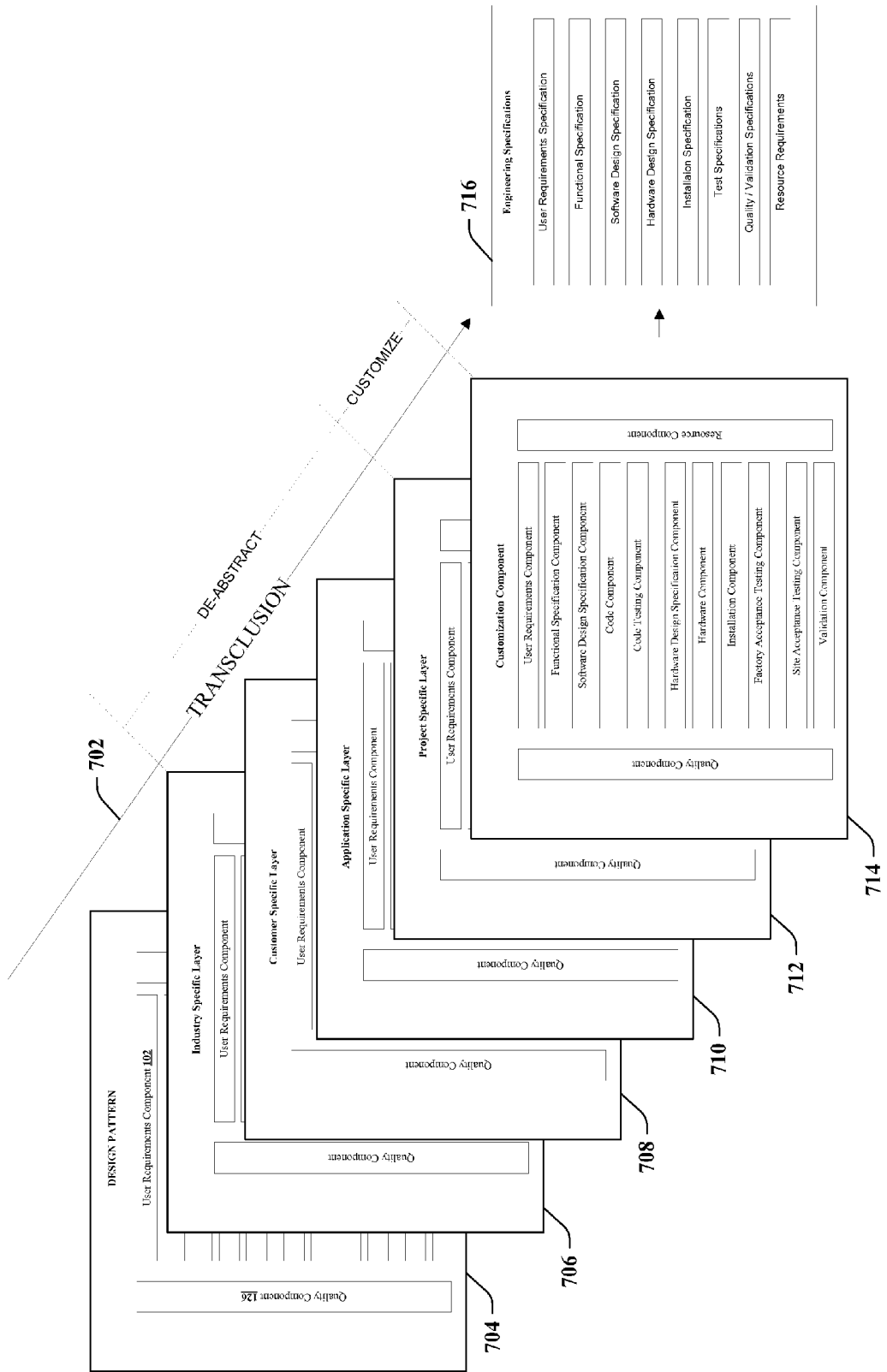
FIG. 7 is an example process for design pattern transclusion and customization in accordance with an aspect of the present specification.

Referring to FIG. 7, an example process 700 for design pattern transclusion and customization is shown in accordance with an aspect of the present innovation. The process 700 is illustrated as proceeding along a transclusion indicator 702 from the most generic application (e.g. design pattern) to the most specialized application (e.g. engineering specification). The process 700 commences with a design pattern 704. The design pattern 704 is a compilation of sub-components having abstract design elements (discussed supra). The design pattern 704 can be de-abstracted by appending one or more class specific layers thereto. As previously discussed, attaching one or more class specific layers de-abstracts the design pattern 704 by adding class specific definitions to the generic design elements. The class specific layers can include but are not limited to an industry specific layer 706, a customer specific layer 708, an application specific layer 710, and a project specific layer 712. Additionally, the class specific layers can include one or more sub-components. For instance, the class specific layers can include sub-components associated with the sub-components contained in the design pattern 704 (discussed supra).

The de-abstracted design patterns can be customized via a customization component 714. The customization component 714 enables customization and/or modification of any of the sub-components contained in the de-abstracted design pattern 704. The customized and/or de-abstracted design pattern 704 is used to generate a set of engineering specifications 716. The engineering specifications 716 include the results of the customized and de-abstracted design pattern 704. For instance, the initial design pattern 704 can include a functional specification component (discussed supra), and the de-abstracted and customized functional specification component generates a functional specification that is included in the engineering specifications 716.

Figure 8:
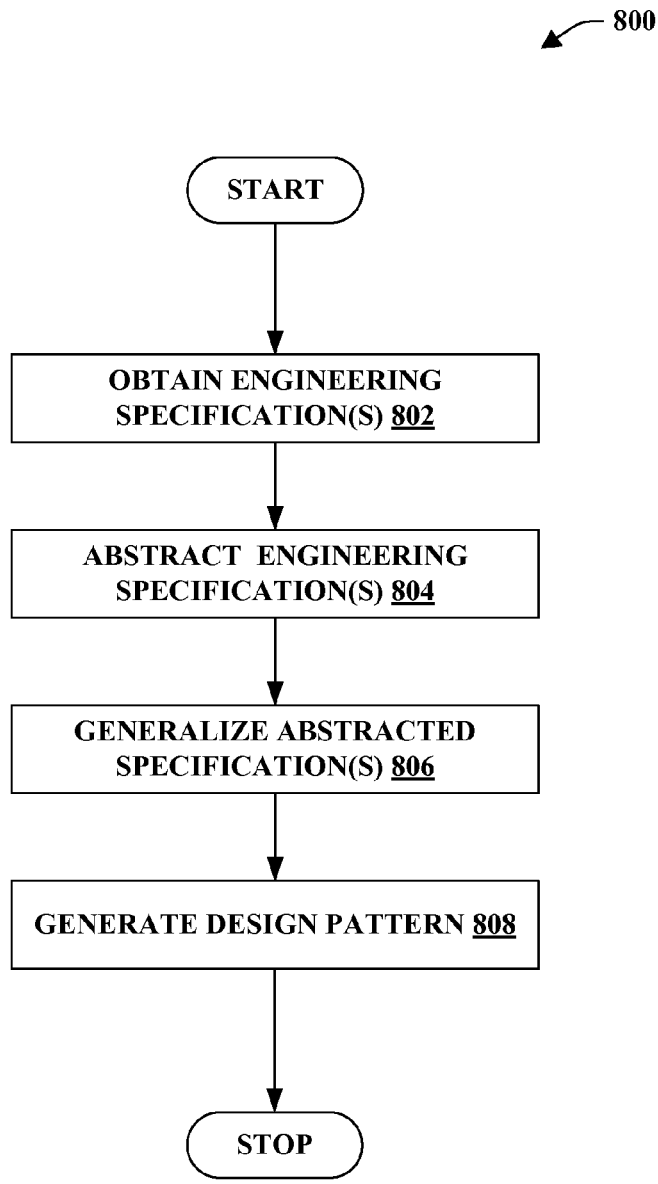
FIG. 8 is a flow chart illustrating a generalized methodology of generating a design template in accordance with the present specification.
Figure 9:
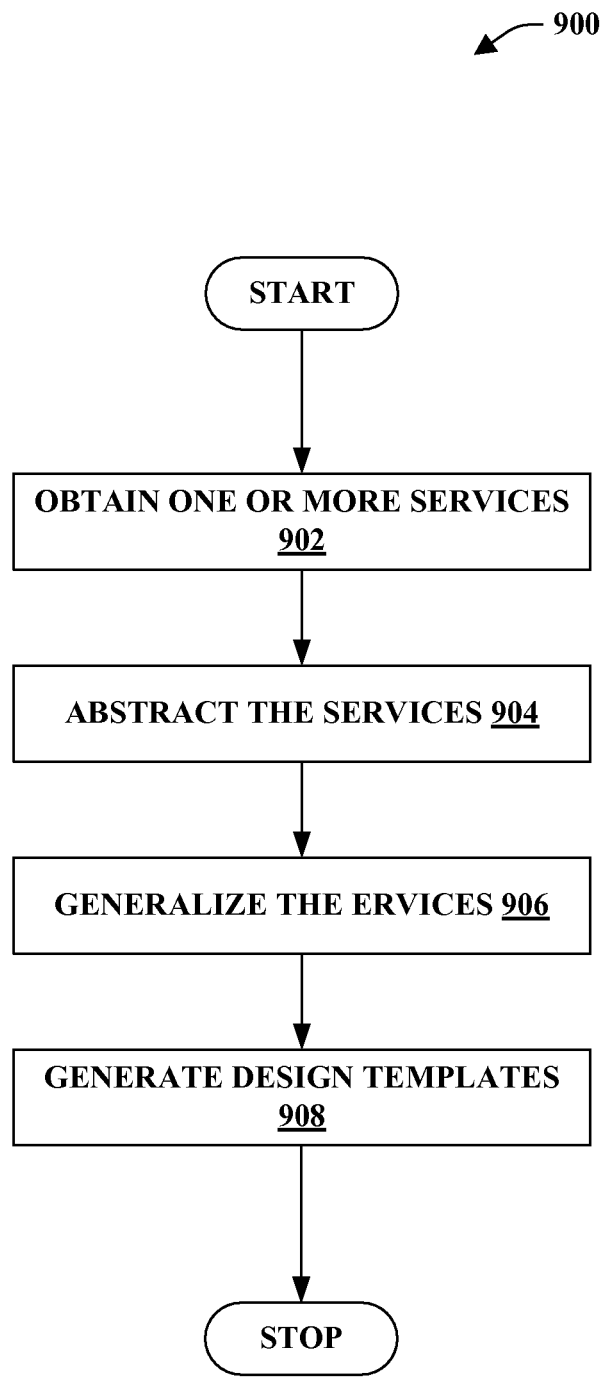
FIG. 9 is a flow chart illustrating a generalized methodology of generating industrial automation services in accordance with the present specification.
Figure 10:
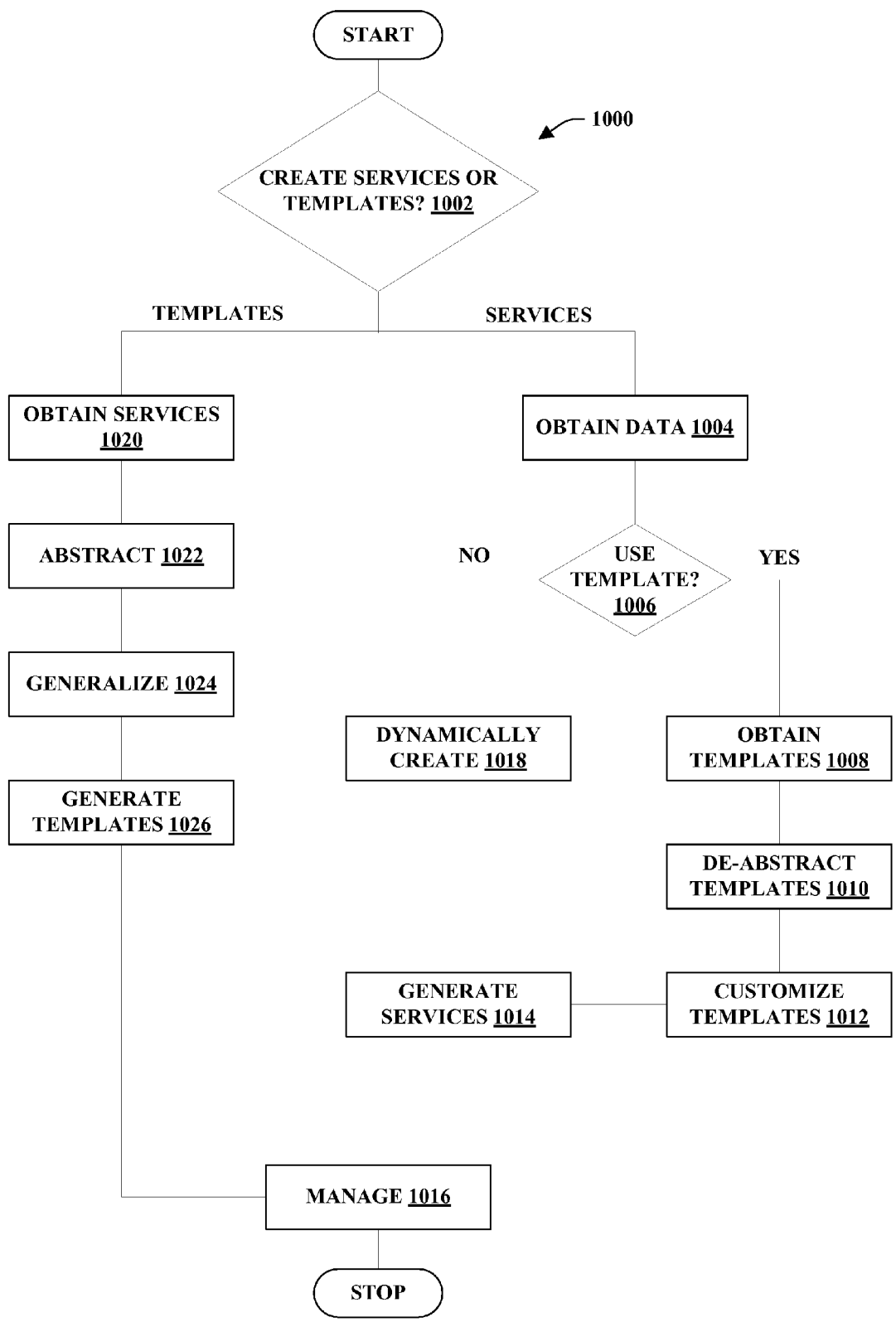
FIG. 10 is a flow chart illustrating a generalized methodology of creating and managing industrial design services in accordance with the present specification.

In view of the example systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 8 illustrates a methodology 800 that facilitates template transclusion and customization. At 802, one or more design templates are acquired. The design templates can be obtained from various sources. For instance, the design templates can be acquired from a data store, user inputs, data transfers (from end users, third parties, associated applications, vendors, manufacturers, etc.), and so forth.

At 804, the design templates can be de-abstracted by appending one or more class specific layers. The class specific layers contain class specific definitions, wherein the definitions include various requirements of the classes. The class specific layers can include but are not limited to a customer specific layer, an industry specific layer, a project specific layer, and an application specific layer.

The de-abstracted design templates can be customized at 806. The de-abstracted design templates can be customized by tailoring the generic design elements of the design template for the specific project, situation, user, etc.

At 808, one or more engineering specifications are generated based at least in part on the customized and de-abstracted design templates. The engineering specifications represent the customized and de-abstracted sub-components of the design pattern.

FIG. 9 illustrates a methodology 900 that facilitates template abstraction and creation. At 902, one or more services (e.g. engineering specifications, etc.) are acquired. At 908, the services can be abstracted. The services can include one or more class specific layers. The class specific layers contain class specific definitions, wherein the definitions include various requirements of the classes. The layers can include but are not limited to a customer specific layer, an industry specific layer, a project specific layer, and an application specific layer. One or more class specific layers can be removed from the engineering specifications. Removing the class specific layers abstracts a service by extracting the associated class specific content, and the remainder is generic design elements of the services. At 906, the abstracted services can be generalized and/or formatted. At 908, the abstracted, generalized, and/or formatted services are used to generate one or more design patterns (e.g. Templates).

It is appreciated that it may not be desirable to completely abstract (e.g. remove all class specific layers) the services in every situation. It may be desirable to keep one or more class specific layers during the creation of the design templates. For example, if an engineering specification is targeted toward machinery or a process that is only used in one industry then it may be advantageous for the industry specific layers to be included in the design template.

The design patterns can be stored in a library (discussed supra), wherein the library can be associated with a template management and/or automated design system. Additionally or alternatively, the abstracted engineering specifications can be formatted prior to creation of the design patterns for use with the template management system, and/or the automated design system.

FIG. 10 illustrates a methodology 1000 that facilitates creation and management of industrial automation services. At 1002, a user determination is made to create and/or modify one or more services, or generate at least one template. At 1004, a set of data is obtained if the user has determined to create or modify a service. The data can relate to a user requirement, a functional specification, a Piping and Instrumentation drawing (P&ID drawing), an electrical drawing, a design template, an operation, a manufacturing execution systems (MES), etc. The user requirements can include but are not limited to general information regarding the objectives of an individual project or group of projects. For example, the set of user requirements can state that the goal of a particular project is to manufacture widgets. Additionally, the user requirements can include quality specifications, such as the rate at which the widgets need to be manufactured, the size of the widgets, quality tolerances, etc. The functional specifications can include the equipment to be used, the sequence of operations, process inputs and outputs, process parameters, process data, operator interaction, and so forth.

At 1006, a user determination is made to create the service based on a template or create a completely new service. If the user decides to create the service based on a template, then one or more design templates are obtained at 1008. As noted supra, the design templates can be acquired from a library, or uploaded by the user. The design templates (e.g. design patterns) are in essence abstracted design specifications, containing only generic design elements. Hardware design templates are representative of generic configurations of one or more hardware modules. Similarly, software design templates are illustrative of generic sequences of events, and handling of exceptions, that can be translated into computer executable commands.

At 1010, the design templates are de-abstracted. The design templates can be de-abstracted by appending one or more class specific layers. The class specific layers contain class specific definitions, wherein the definitions include various requirements of the classes. The class specific layers can include but are not limited to a customer specific layer, an industry specific layer, a project specific layer, and an application specific layer. For example, a design can require a customer specific layer, wherein the customer specific layer includes a set of customer specific definitions. Appending the customer specific layer to the design template de-abstracts the template by adding the customer specific definitions to the generic design elements.

At 1012, the user customizes the de-abstracted design templates. The de-abstracted design templates can be customized by tailoring the generic design elements of the design template for the specific project. The design templates can be customized based at least in part on at least one of: a user requirement, a functional specification, or user input. Additionally or alternatively, a customization schema can be determined based at least in part on at least one of: a user requirement, or a functional specification, or user input. The customization schema can determine the generic design elements to be customized, and/or the manner in which said generic design elements are customized.

If at 1006, the user decides to create a new service, then at 1014 one or more services are dynamically generated. The services can be dynamically created using a design tool, wherein an interface component graphically represents industrial automation services, and the design tool provides for users to develop new services by associating graphically presented design elements with the services. Moreover, the design tool can provide for users to easily expose functionalities of underlying chunks of code, and combine or execute such code in the form of services. A new service can also be created by clustering a set of other services together (serially, in parallel, or combination thereof).

At 1014, one or more services are generated. The user can expose underlying chunks of code; generate drawings, B.O.M, etc. Subsequently, the user can store the services in the library and/or otherwise manage the services at 1016.

At 1018, the user can dynamically create a new service by associating graphically presented services and/or design elements with the service. Moreover, users can easily expose functionalities of underlying chunks of code, and combine or execute such code in the form of services. In addition, new services can be created by clustering a set of other services together (serially, in parallel, or combination thereof). Subsequently, the user can store the services in the library and/or otherwise manage the services at 1016.

If at 1002, the user elects to create a template, then at 1020 one or more services are obtained. As previously discussed, the services can be obtained from a data store or from the user. The services can relate to one or more design specifications, drawings, software code, testing schemas, bills of materials (B.O.M), installation specifications, manufacturing execution systems (MES), enterprise resource planning (ERP), etc. The design specifications can include but are not limited to a software design specification, or a hardware design specification. The software design specifications can be expressed as high-level representations illustrative of a sequence of events and handling of exceptions that can be translated into computer executable commands. The hardware design specifications can be expressed as high-level representations of one or more hardware modules, and configurations of the modules, including wiring, communications, etc.

At 1022, the services can be abstracted. The services are abstracted by removing one or more class specific layers, wherein removing the class specific layers abstracts the services by extracting the associated class specific content, and the remainder is generic design elements of the design specification. The class specific layers can include but are not limited to a customer specific layer, an industry specific layer, a project specific layer, and an application specific layer.

Next, the abstracted services can be generalized at 1024, wherein generalizing the abstracted services can include formatting identifiers, designations, tags, etc. for use as design templates. At 1026, one or more design templates are generated based on the abstracted and generalized services. It is appreciated that the user can modify or control the level of abstraction and/or generalization to achieve a desired design template. At 1016, the user can manage or store the design templates.

Figure 11:
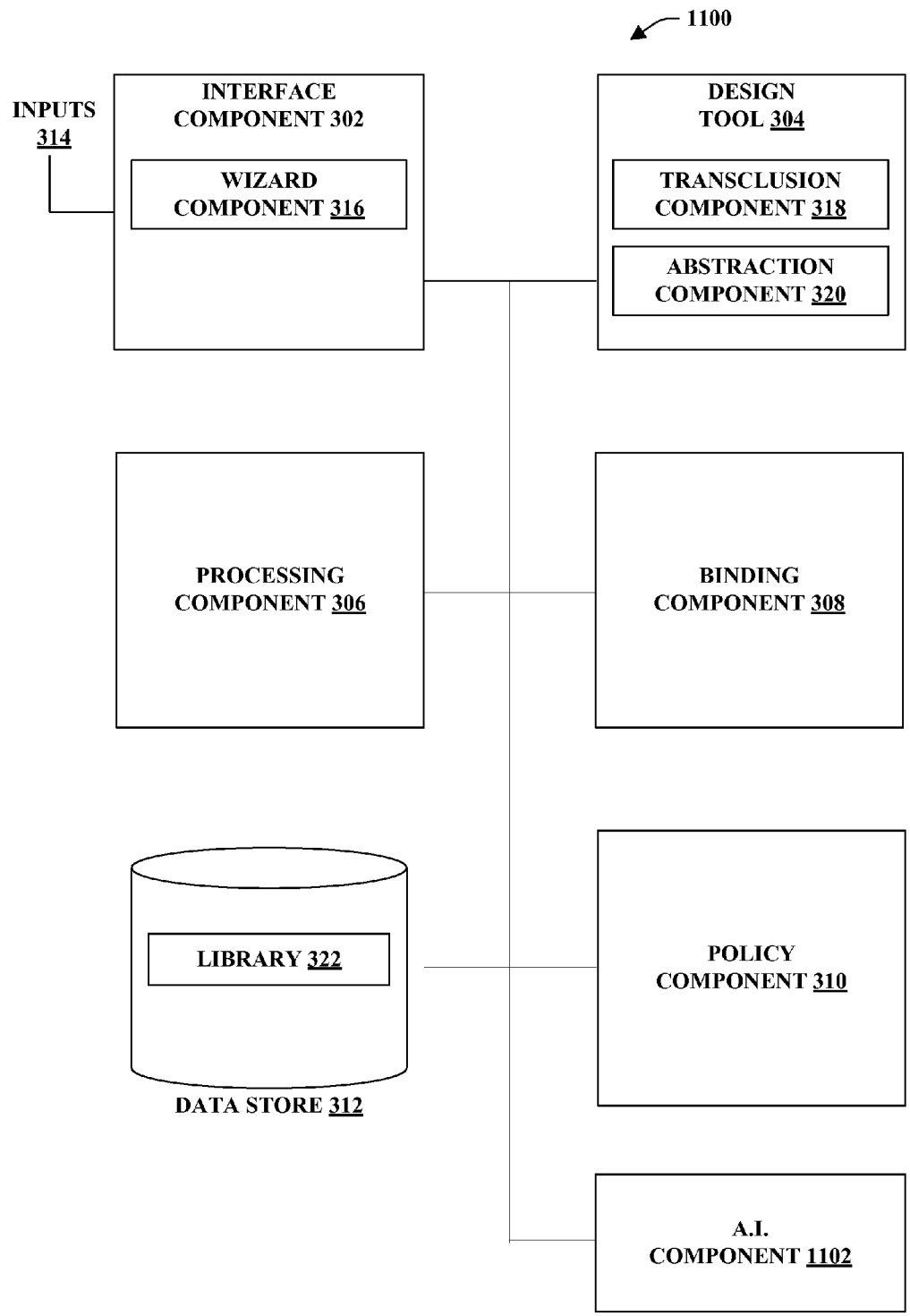
FIG. 11 illustrates a system that employs an artificial intelligence component which facilitates automating one or more features in accordance with the subject specification.

FIG. 11 illustrates a system 1100 that employs an artificial intelligence (AI) component 1102 which facilitates automating one or more features in accordance with the subject innovation. The subject innovation (e.g., in connection with inferring) can employ various AI-based schemes for carrying out various aspects thereof. For example, a process for de-abstracting the design templates can be facilitated via an automatic classifier system and process.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 12:
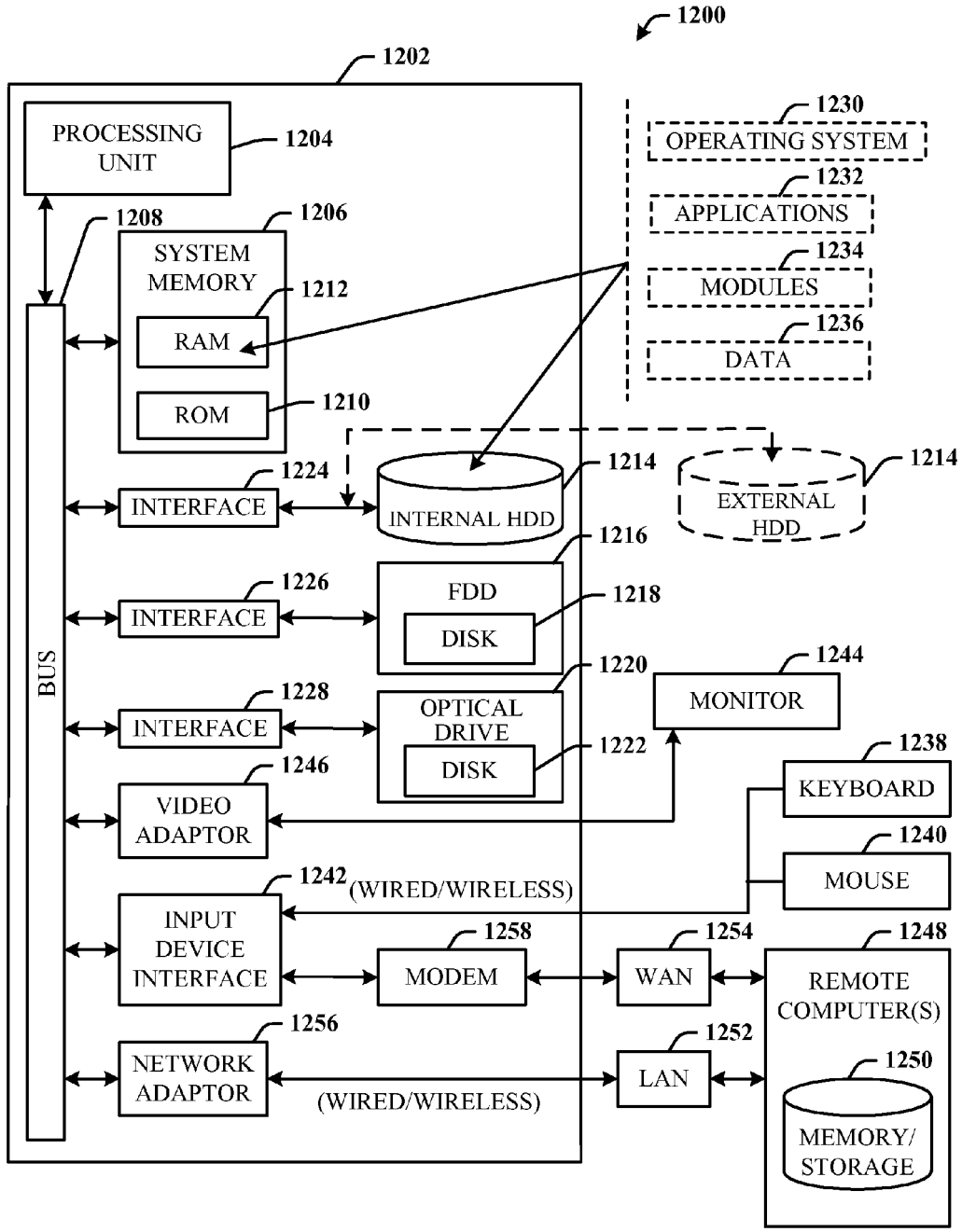
FIG. 12 is a schematic block diagram illustrating a suitable operating environment in accordance with an aspect of the subject specification.

Referring now to FIG. 12, there is illustrated a block diagram of a computer operable to execute the disclosed architecture. In order to provide additional context for various aspects of the subject innovation, FIG. 12 and the following discussion are intended to provide a brief, general description of a suitable computing environment 1200 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an example environment 1200 for implementing various aspects of the innovation that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
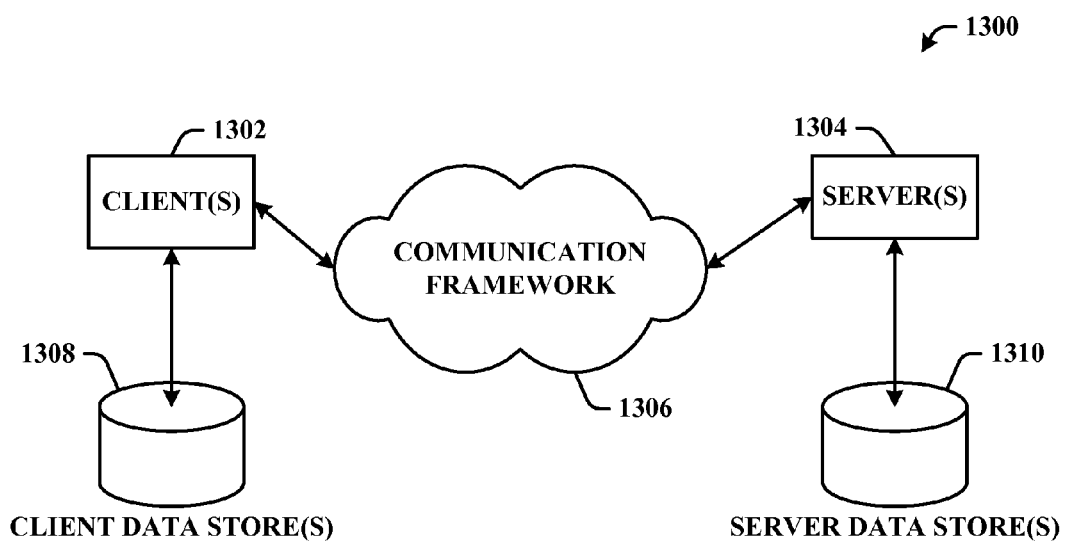
FIG. 13 is a schematic block diagram of a sample-computing environment with which the subject specification can interact.

Referring now to FIG. 13, there is illustrated a schematic block diagram of an example computing environment 1300 in accordance with the subject innovation. The system 1300 includes one or more client(s) 1302. The client(s) 1302 can be hardware and/or software (e.g., threads, processes, computing devices). The client(s) 1302 can house cookie(s) and/or associated contextual information by employing the innovation, for example.

Referring now to FIG. 13, there is illustrated a schematic block diagram of an example computing environment 1300 in accordance with the subject innovation. The system 1300 includes one or more client(s) 1302. The client(s) 1302 can be hardware and/or software (e.g., threads, processes, computing devices). The client(s) 1302 can house cookie(s) and/or associated contextual information by employing the innovation, for example.

The system 1300 also includes one or more server(s) 1304. The server(s) 1304 can also be hardware and/or software (e.g., threads, processes, computing devices). The servers 1304 can house threads to perform transformations by employing the innovation, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor;
a memory communicatively coupled to the processor, the memory having stored therein computer-executable instructions, comprising:
an interface component configured to receive user requirements specifying at least one manufacturing goal;
a design tool configured to de-abstract at least one design template using the user requirements to generate an engineering specification defining at least one industrial automation service to achieve the at least one manufacturing goal; and
wherein the design template comprises:
a software specification component configured to employ a functional specification of the engineering specification to generate a software design specification of the engineering specification that defines a representation of software required to achieve the at least one manufacturing goal, wherein the functional specification defines at least one equipment required to achieve the at least one manufacturing goal; and
a hardware specification component configured to generate at least one hardware design specification of the engineering specification based upon at least one of the functional specification or software design specification, wherein the hardware design specification defines at least one of an input or an output of the equipment to achieve the at least one manufacturing goal.

2. The system of claim 1, wherein the design template comprises a functional specification component configured to generate the functional specification of the engineering specification.

3. The system of claim 2, wherein the functional specification further defines an engineering process to achieve the at least one manufacturing goal.

4. The system of claim 2, wherein the hardware design specification further defines at least one network connection required for the at least one equipment.

5. The system of claim 4, wherein the design template comprises a hardware component configured to generate a bill of materials of the engineering specification based upon the at least one hardware design specification.

6. The system of claim 5, wherein the design template comprises an installation component configured to generate an installation specification of the engineering specification based upon the at least one hardware design specification and bill of materials, wherein the installation specification defines specifications for installation of the materials.

7. The system of claim 1, wherein the design template comprises a code component configured to generate at least one software module based upon the software design specification.

8. The system of claim 7, wherein the design template comprises a code testing component configured to generate at least one testing specification to test the at least one software module.

9. The system of claim 8, wherein the code testing component is further configured to test the at least one software module using the at least one testing specification.

10. The system of claim 9, wherein the code testing component is further configured to generate at least one testing report indicating at least one result of the test.

11. The system of claim 1, wherein the design template comprises a factory acceptance testing component configured to test a design build based on the engineering specification comprising at least one software or hardware component prior to installation.

12. The system of claim 11, wherein the design template comprises a site acceptance testing component configured to test a design build based on the engineering specification comprising at least one software or hardware components during or after installation.

13. The system of claim 12, wherein the design template comprises a validation component configured to validate test results from the factory acceptance testing component and site acceptance testing component.

14. The system of claim 1, wherein the design template comprises a resource component configured to determine a cost amount based upon the user requirements.

15. The system of claim 14, wherein the design tool generates the engineering specification such that a project based upon the engineering specification will be within the cost amount.

16. The system of claim 1, wherein the design template comprises a quality component configured to determine a quality metric based upon the user requirements, and wherein the design tool generates the engineering specification further based upon the quality metric.

17. A non-transitory computer-readable medium having instructions stored thereon that, in response to execution, cause at least one device including a processor to perform operations comprising:
obtaining a set of user requirements specifying at least one goal of an industrial process;
de-abstracting at least one design template using the user requirements to generate an engineering specification that defines at least one industrial automation service for achieving the at least goal of the industrial process; and
employing a functional specification of the engineering specification to generate a software design specification that defines a representation of software required to achieve the at least one goal of the industrial process, wherein the functional specification defines at least one equipment required to achieve the at least one manufacturing goal; and
generating at least one hardware design specification of the engineering specification based upon at least one of the functional specification or software design specification, wherein the hardware design specification defines at least one of an input or an output of the equipment to achieve the at least one manufacturing goal.

18. The non-transitory computer-readable medium of claim 17, wherein the generating the engineering specification further comprises generating the functional specification.

19. The non-transitory computer-readable medium of claim 18, wherein the generating the functional specification further comprises defining an engineering process to achieve the at least one goal of the industrial process.

20. The non-transitory computer-readable medium of claim 18, wherein the hardware design specification further defines at least one network connection required for the at least one equipment.

21. The non-transitory computer-readable medium of claim 20, wherein the generating the engineering specification further comprises generating a bill of materials based upon the at least one hardware design specification.

22. The non-transitory computer-readable medium of claim 21, wherein the generating the engineering specification further comprises generating an installation specification of the engineering specification based upon the at least one hardware design specification and bill of materials, wherein the installation specification defines specifications for installation of the materials.

23. The non-transitory computer-readable medium of claim 17, wherein the generating the engineering specification further comprises generating at least one software module based upon the software design specification.

24. The non-transitory computer-readable medium of claim 23, wherein the generating the engineering specification further comprises generating at least one testing specification to test the at least one software module.

25. The non-transitory computer-readable medium of claim 17, wherein the generating the engineering specification further comprises determining a cost amount based upon the user requirements.

26. The non-transitory computer-readable medium of claim 25, further comprises generating the engineering specification such that a project based upon the engineering specification will be within the cost amount.

27. The non-transitory computer-readable medium of claim 17, wherein the generating the engineering specification further comprises determining a quality metric based upon the user requirements.

28. The non-transitory computer-readable medium of claim 27, further comprising generating the engineering specification further based upon the quality metric.

29. A method, comprising:
collecting, by a device including a processor, a set of user data specifying at least one manufacturing goal;
de-abstracting, by the device, at least one design template using the set of user data to generate an engineering specification that defines at least one industrial automation service to accomplish the at least manufacturing goal; and
employing, by the device, a functional specification of the engineering specification to generate a software design specification that defines a representation of software required to achieve the at least one goal of the industrial process, wherein the functional specification defines at least one equipment required to achieve the at least one manufacturing goal; and
generating, by the device, at least one hardware design specification of the engineering specification based upon at least one of the functional specification or software design specification, wherein the hardware design specification defines at least one of an input or an output of the equipment to achieve the at least one manufacturing goal.

30. The method of claim 29, wherein the generating the engineering specification further comprises generating the functional specification.

31. The method of claim 30, wherein the generating the functional specification further comprises defining an engineering process to accomplish the at least manufacturing goal.

32. The method of claim 30, wherein the hardware design specification further defines at least one network connection required for the at least one equipment.

33. The method of claim 32, wherein the generating the engineering specification further comprises generating a bill of materials based upon the at least one hardware design specification.

34. The method of claim 33, wherein the generating the engineering specification further comprises generating an installation specification of the engineering specification based upon the at least one hardware design specification and bill of materials, wherein the installation specification defines specifications for installation of the materials.

35. The method of claim 29, wherein the generating the engineering specification further comprises generating at least one software module based upon the software design specification.

36. The method of claim 35, wherein the generating the engineering specification further comprises generating at least one testing specification to test the at least one software module.

37. The method of claim 29, wherein the generating the engineering specification further comprises determining a cost amount based upon the user requirements.

38. The method of claim 29, further comprising generating, by the device, the engineering specification such that a project based upon the engineering specification will be within the cost amount.

39. A system, comprising:
- means for collecting a set of user data specifying at least one goal of an industrial process;
- means for de-abstracting at least one design template using the set of user data to generate an engineering specification that defines at least one industrial automation service for accomplishing the at least one goal of an industrial process; and
- means for employing a functional specification of the engineering specification to generate a software design specification that defines a representation of software required to achieve the at least one goal of the industrial process, wherein the functional specification defines at least one equipment required to achieve the at least one manufacturing goal; and
- means for generating at least one hardware design specification of the engineering specification based upon at least one of the functional specification or software design specification, wherein the hardware design specification defines at least one of an input or an output of the equipment to achieve the at least one manufacturing goal.

* * * * *